(12) United States Patent
Park et al.

(10) Patent No.: US 7,822,440 B2
(45) Date of Patent: Oct. 26, 2010

(54) METHOD AND APPARATUS FOR OPERATING A COMMUNICATION STATION

(75) Inventors: Minyoung Park, Portland, OR (US); Guoqing Li, Hillsboro, OR (US); Liuyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 975 days.

(21) Appl. No.: 11/615,955

(22) Filed: Dec. 23, 2006

(65) Prior Publication Data

US 2008/0153502 A1 Jun. 26, 2008

(51) Int. Cl.
*H04M 1/00* (2006.01)
(52) U.S. Cl. .................... 455/561; 455/446; 455/562.1; 370/331
(58) Field of Classification Search ................ 455/446, 455/561, 562.1; 370/331
See application file for complete search history.

(56) References Cited

U.S. PATENT DOCUMENTS

| 7,075,902 | B2 * | 7/2006 | El Batt | 370/310 |
| 7,460,082 | B2 * | 12/2008 | Li et al. | 343/893 |
| 7,616,154 | B2 * | 11/2009 | Lee | 342/374 |
| 2004/0242275 | A1 * | 12/2004 | Corbett et al. | 455/562.1 |
| 2007/0286130 | A1 * | 12/2007 | Shao et al. | 370/336 |
| 2007/0297365 | A1 * | 12/2007 | Li et al. | 370/331 |

OTHER PUBLICATIONS

Bandyopadhyay, S , et al., "An Adaptive MAC and Directional Routing Protocol for Ad Hoc Wireless Network Using ESPAR Antenna", *MOBIHOC 2001*, (Oct. 4-5, 2001),1-4.

Choudhury, Romit R., et al., "Deafness: A MAC Problem in Ad Hoc Networks when using Directional Antennas", *Proceedings of the 12th IEEE International Conference on Network Protocols (ICNPA-04)*, (Oct. 5-8, 2004),283-292.

Takai, Mineo , et al., "Directional Virtual Carrier Sensing for Directional Antennas in Mobile Ad Hoc Networks", *MOBIHOCA-02*, (Jun. 9-11, 2002, EPFL),1-11.

* cited by examiner

*Primary Examiner*—David Q Nguyen
(74) *Attorney, Agent, or Firm*—Schwabe, Williamson & Wyatt, P.C.

(57) ABSTRACT

A method for operating a communication station in a communicating environment includes: (a) monitoring the environment to ascertain whether the station is receiving an unintended sensed signal not intended for the station from at least one signal source; (b) if the station has not received a predetermined number of unintended sensed signals during a predetermined time interval, operating the station in an omnidirectional mode; and (c) if the station has received a predetermined number of sensed signals during the predetermined time interval, saving an indication of a reception direction from which arrived each unintended sensed signal; and operating the station in a directional mode. While in the directional mode, the station is sensitive to receiving signals arriving from a sensing direction other than from a reception direction, and the station transmits signals toward the sensing direction.

12 Claims, 4 Drawing Sheets

METHOD AND APPARATUS FOR OPERATING A COMMUNICATION STATION

BACKGROUND

Currently deployed wireless LANs (Local Area Networks) are generally based on the IEEE (Institute of Electrical and Electronic Engineers) 802.11 MAC (Media-specific Access Control) protocol. Generally, using the 802.11 MAC each transmitter and receiver uses one or two omni-directional antennas for data handling, such as data transmission and reception. For a receiver the general purpose of the two omni-directional antennas is to choose one antenna from the two available antennas that has the best signal quality (e.g., as measured using signal-to-noise ratio) so that the signal can obtain a diversity gain and fading can be mitigated. However, when using an omni-directional antenna data is transmitted to all directions and is received from all directions. For this reason nodes close to either the transmitter or the receiver should preferably remain silent so that the close-in nodes do not interfere with communications between either the transmitter or the receiver. Such an arrangement keeping close-in antennas silent is known as a "clearing the floor" or CSMA/CA (Carrier Sense Multiple Access with Collision Avoidance) strategy. A CSMA/CA strategy assures a certain level of collision free communications. However, as a side effect, a CSMA/CA strategy limits the capacity of a network by forcing nodes near either the transmitter or the receiver (i.e., close-in nodes) to remain silent.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
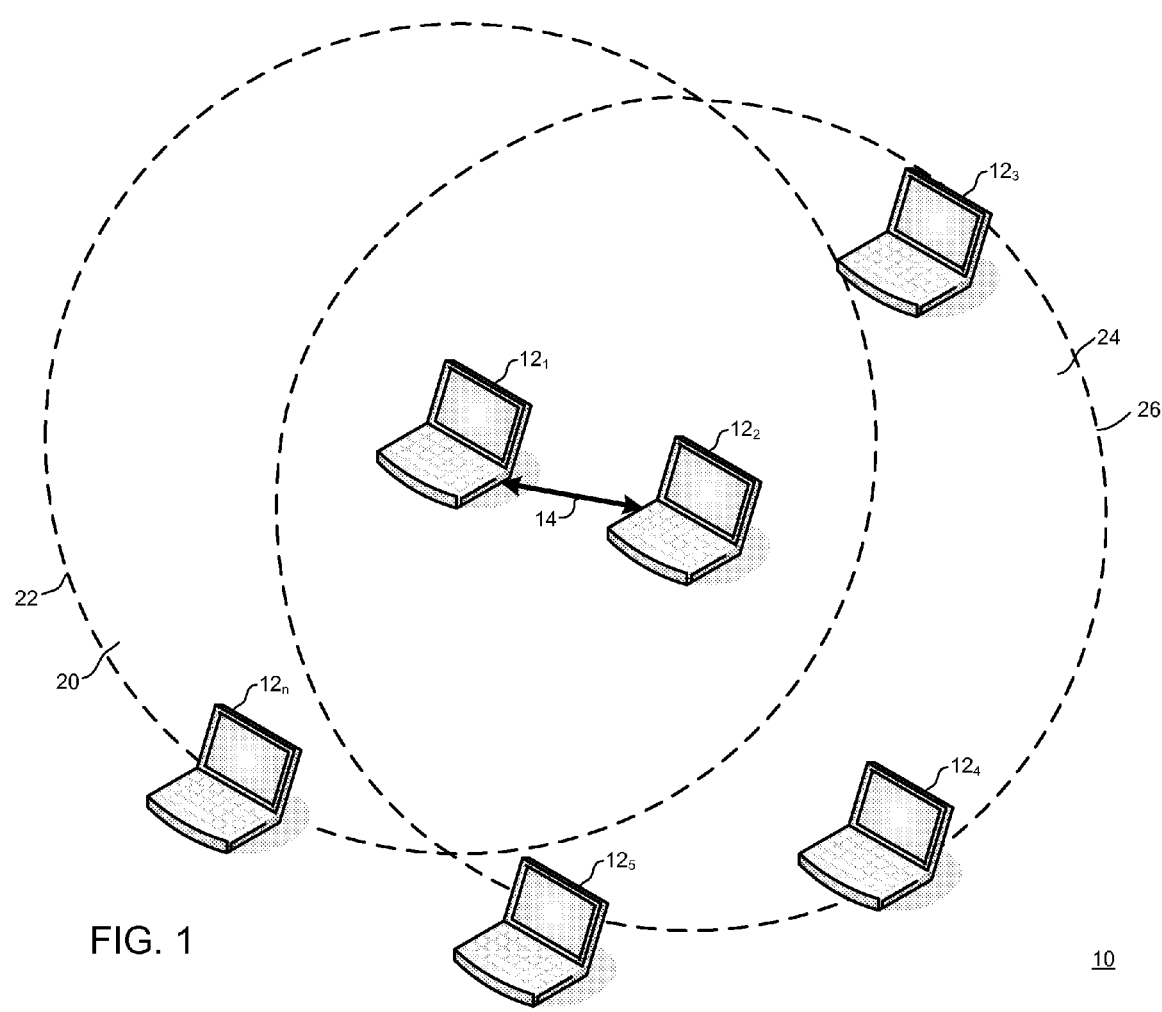
FIG. 1 illustrates a communication system operating in an omni-directional mode.

It will be appreciated that for simplicity and clarity of illustration, elements illustrated in the figures have not necessarily been drawn to scale.

For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

FIG. 1 illustrates a communication system operating in an omni-directional mode. In FIG. 1, a communication environment 10 may include a plurality of communication stations $12_1$, $12_2$, $12_3$, $12_4$, $12_5$, $12_n$. The indicator "n" is employed to signify that there can be any number of communication stations in communication environment 10. The inclusion of six communication stations $12_1$, $12_2$, $12_3$, $12_4$, $12_5$, $12_n$ in FIG. 1 is illustrative only and does not constitute any limitation regarding the number of communication stations that may be included in a communication environment employing the present invention.

In FIG. 1, communication stations $12_1$, $12_2$ may communicate, as indicated by an arrow 14. Communication station $12_1$ may communicate in an omni-directional mode, as indicated by communication station $12_1$ communicating substantially throughout an area 20 circumscribed by a circle 22. Communication station $12_2$ may communicate in an omni-directional mode, as indicated by communication station $12_2$ communicating substantially throughout an area 24 circumscribed by a circle 26. Circle 22 may represent the range of communication achieved by communication station $12_1$ using omni-directional communications. Circle 26 may represent the range of communication achieved by communication station $12_2$ using omni-directional communications.

When communication stations $12_1$, $12_2$ communicate with each other, other communication stations $12_3$, $12_4$, $12_5$, $12_n$ may be within communication range with at least one of communication stations $12_1$, $12_2$, as indicated by communication stations $12_3$, $12_4$, $12_5$, $12_n$ being within at least one of circles 22, 26. If any of communication stations $12_3$, $12_4$, $12_5$, $12_n$ transmits while communication stations $12_1$, $12_2$ are communicating, the transmission may interfere with communications between communication stations $12_1$, $12_2$. One solution to avoiding such interference may be to require that communication stations $12_3$, $12_4$, $12_5$, $12_n$ stay silent while communication stations $12_1$, $12_2$ are communicating in order to prevent possible collision. Keeping close-in antennas (e.g., stations within transmitting range of communicating stations $12_1$, $12_2$) silent is known as a "clearing the floor" or a CSMA/CA (Carrier Sense Multiple Access with Collision Avoidance) strategy. A CSMA/CA strategy may assure a certain level of collision free communications. However, as a side effect, a CSMA/CA strategy may limit the capacity of a network by forcing nodes near either the transmitter or the receiver (i.e., close-in nodes) to remain silent. As the density of communication environment 10 increases, the likelihood of unwanted collisions may become worse and applying a CSMA/CA strategy may result in only a small fraction of a network in a communication environment being active while the rest of the network is required to stay silent to avoid interference or collision with the active portion of the network.

Another technology known as MIMO (Multiple-Input-Multiple-Output) technology employs multiple antennas on both a transmitter and a receiver. MIMO technology is an alternate way to increase the capacity or quality of a communication link between a transmitter and a receiver. Spatial multiplexing, a technique which effects transmitting multiple data streams from multiple transmit antennas using the same frequency band and time slot, is one use of MIMO technology to increase capacity of a link between a transmitter and a receiver. However, when one employs a CSMA/CA-MAC protocol overlaying a MIMO physical layer in an omni-directionally communicating environment, the problem of limiting the capacity of a network may still remain.

Heterogeneous devices, such as cordless phones or similar devices may use different physical layer technology or MAC protocol than is employed by communication stations $12_n$, but may still operate in the same frequency band as communication stations $12_n$. Such heterogeneous wireless devices may transmit without first sensing the channel to avoid a possible collision. That is, such heterogeneous wireless devices may not follow a CSMA/CA protocol. If such non-CSMA/CA heterogeneous wireless devices are located within the same contention floor of CSMA/CA based wireless devices (i.e., in the same communication environment), the CSMA/CA based devices (e.g., communication stations $12_n$) may suffer interference from nearby non-CSMA/CA based wireless devices and network performance may be degraded.

A directional beamforming technique is another technology using multiple antennas. In contrast to spatial multiplexing, beamforming may transmit and receive a single data stream using all antennas in a MIMO device. Beamforming technology permits forming a directional beam toward a selected direction. Limiting the direction toward which a beam "looks" may configure transmissions to avoid interfering with other neighboring nodes or may at least mitigate interference from neighboring nodes. Using a directional transmission or reception scheme using beamforming techniques may increase the capacity of a network by increasing simultaneous communications in the same contention floor (i.e., communication environment). However, when the density of a network is low (i.e., not much contention is extant in the same contention floor), spatial reuse gain that beamforming may avail may decrease. In such low density conditions it might be better to use multiple antennas for transmitting and receiving in a spatial multiplexing mode rather than in a beamforming mode to increase capacity of a link.

In substantially LOS (Line-Of-Sight) communication environments, with multiple omni-directional antennas one can form a beam toward a certain direction. With as few as three omni-directional antennas, one can form a sufficiently narrow beam toward a certain direction to effect reduction of interference in a communication environment. As the number of antennas is increased narrower beams may be formed. One may employ a beamforming technique to create a sweeping beam pattern for monitoring a communication environment to ascertain presence of signals received at the sweeping communication station. The term "received" in this context indicates a signal having sufficient signal strength to be detected by a communication station and therefore having sufficient signal strength to contribute to interference with reception by the communication station.

A rich multipath communication environment may approximate a NLOS (Non-Line-Of-Sight) communication environment so that determining the direction of an arriving signal may be difficult. Some communication environments may have few multipaths. By way of example and not by way of limitation, an office environment may have as few as two or three multipaths. If a communication environment has few multipaths with sufficiently different directions, the multipaths may be distinguished. A receiver that can detect two strong signals which are coming from two different directions may use the information to determine whether the receiver will transmit a signal to one sensed direction or both directions or not transmit at all, depending on the protocol employed by the receiver.

Figure 2:
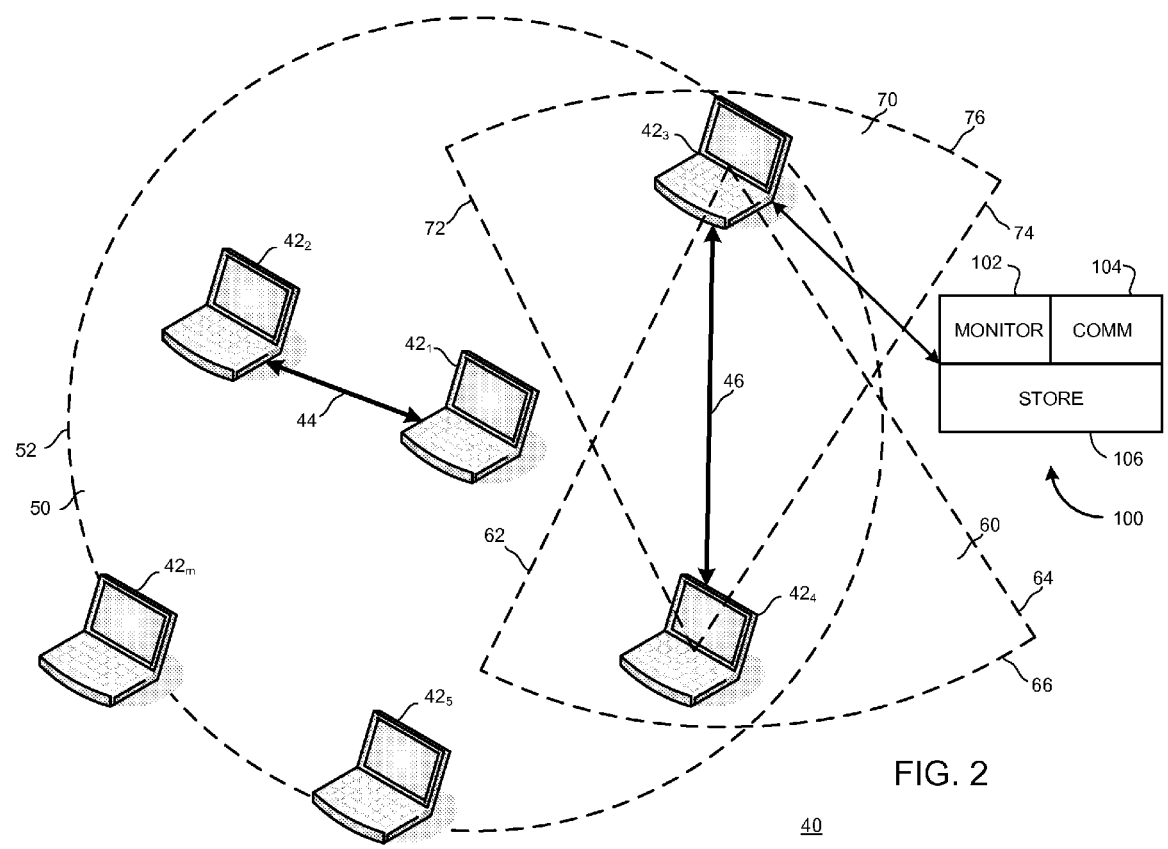
FIG. 2 illustrates a communication system employing the apparatus of the present invention operating partly in an omni-directional mode and partly in a directional mode.

FIG. 2 illustrates a communication system employing the apparatus of the present invention operating partly in an omni-directional mode and partly in a directional mode. In FIG. 2, a communication environment 40 may include a plurality of communication stations $42_1, 42_2, 42_3, 42_4, 42_5, 42_m$. The indicator "m" is employed to signify that there can be any number of communication stations in communication environment 40. The inclusion of six communication stations $42_1, 42_2, 42_3, 42_4, 42_5, 42_n$ in FIG. 2 is illustrative only and does not constitute any limitation regarding the number of communication stations that may be included in a communication environment employing the present invention.

In FIG. 2, communication stations $42_1, 42_2$ may communicate, as indicated by an arrow 44. Communication station $12_1$ may communicate in an omni-directional mode, as indicated by communication station $42_1$ communicating substantially throughout an area 50 circumscribed by a circle 52. Communication station $42_2$ may also communicate in an omni-directional mode. In order to avoid cluttering FIG. 2, the area in which communication station $42_2$ may communicate in an omni-directional mode is not indicated in FIG. 2. However, one skilled in the art of wireless communications will understand that such an area of communication may include communication station $42_1$ when communication station $42_2$ communicates in an omni-directional mode with communication station $42_1$. Circle 52 represents the range of communication achieved by communication station $42_1$ using omni-directional communications.

When communication stations $42_1, 42_2$ communicate with each other, other communication stations $42_3, 42_4, 42_5, 42_n$ may be within communication range with at least one of communication stations $42_1, 42_2$, as indicated by communication stations $42_3, 42_4, 42_5, 42_n$ being within circle 52.

To avoid interfering with communications between communication stations $42_1, 42_2$, communication stations $42_3, 42_4$ may communicate in a directional mode. In such a directional mode, communication stations $42_3, 42_4$ may use beamforming techniques to limit the direction toward each communication station $42_3, 42_4$ transmits signals and limit the direction toward which each communication station $42_3, 42_4$ "listens" to receive incoming signals. Limiting transmission directions to areas away from communication stations $42_1, 42_2$ may avoid or at least reduce interference affecting communication between communication stations $42_1, 42_2$ by transmissions from communication stations $42_3, 42_4$.

Operating in a directional mode, communication station $42_3$ may establish an area of communications 60 into which signals are transmitted and from which signals may be received by communication station $42_3$. Area 60 may be delineated by radii 62, 64 substantially from communication station $42_3$ and an arc 66 substantially centered on communication station $42_3$. Operating in a directional mode, communication station $42_4$ may establish an area of communications 70 into which signals are transmitted and from which signals may be received by communication station $42_4$. Area 70 may be delineated by radii 72, 74 substantially from communication station $42_4$ and an arc 76 substantially centered on communication station $42_4$.

Thus, by way of example and not by way of limitation, communication station $42_3$ may monitor communication environment 40, such as by listening for signals in communication environment 40 using a sweeping directional beam. The sweeping directional beam may sweepingly rotate through area 60 in a 360 degree rotation about communication station $42_3$ to substantially completely monitor communication environment 40. The monitoring by communication station $42_3$ may be performed to ascertain whether communication station $42_3$ is situated to receive at least one unintended signal not intended for communication station $42_3$, such as by way of example and not by way of limitation omni-directional transmissions from communication stations $42_1, 42_2$. If communication station $42_3$ did not encounter or receive unintended signals, communication station $42_3$ could transmit and receive in an omni-directional mode (not shown in FIG. 2). Because communication station $42_3$ encounters or receives unintended signals (as illustrated in FIG. 2), communication station $42_3$ may transmit and receive signals with communication station $42_4$ in a directional mode. Directional mode communication between communication stations $42_3, 42_4$ may establish communication areas 60, 70 to reduce or eliminate receiving omni-directional signals originating from communication stations $42_1, 42_2$ as well as reduce the interference caused by $42_3, 42_4$ to communication stations $42_1, 42_2$.

Unintended signals that may cause a communication station $42_m$ to begin operation in a directional mode may include signals that cannot be decoded by a communication station $42_m$, such as noise or other interfering signals. Such signals may come from, by way of example and not by way of limitation, heterogeneous devices such as cordless phones or similar devices that may use different physical layer technology or MAC protocol than is employed by communication stations $42_m$, but may still operate in the same frequency band as communication stations $42_m$. Such heterogeneous wireless devices may transmit without first sensing the channel to avoid a possible collision and may interfere with communication stations $42_m$.

The present invention may employ multiple antennas (e.g., in a MIMO system) not only for omni-directional communications and directional communications. By way of example and not by way of limitation, the present invention may employ multiple antennas in a communication station to establish spatial multiplexing communications to increase the capacity of a single link, and may also employ the multiple antennas to establish adaptive beamforming to increase simultaneous transmissions in the communication environment. Directional communications, as may be established using adaptive beamforming, may mitigate interference from other nodes or heterogeneous wireless devices in the communication environment so that overall network capacity may be increased.

Directional communications may be most useful in a LOS channel environment in which communication stations have clear lines of sight to each other. Communication stations $42_m$ may switch their transmission modes and reception modes automatically between an omni-directional communication mode and a directional communication mode in response to signals detected while monitoring communication environment 40. When a communication station $42_m$ does not detect any active transmission nearby (e.g., an unintended signal), the communication station $42_m$ may operate in an omni-directional mode. When a communication station $42_m$ detects an active transmission nearby, the communication station $42_m$ may change to operate in a directional mode.

In a preferred embodiment of the present invention, when a communication station $42_m$ has not received any packet (i.e., signal transmission) or interference (e.g. a signal transmission that cannot be decoded) from neighboring nodes for a predetermined period of time, communication station $42_m$ may use multiple antennas in an omni-directional mode (such as by way of example and not by way of limitation, spatial multiplexing or space-time block coding (STBC)) to either increase the capacity or the quality of a link. For example, if communication station $42_3$ has data to send to communication station $42_4$ and has not heard any communication recently from neighboring communication stations $42_m$ in communication environment 40, communication station $42_3$ may transmit a control packet (e.g., a Request-To-Send (RTS) packet) with time information (e.g., a network allocation vector (NAV)) indicating how long the data transmission to be sent to communication station $42_4$ in the omni-directional mode will last. Because communication station $42_3$ is using the omni-directional mode, other communication stations $42_m$ in communication environment 40 may receive the RTS packet.

If communication station $42_3$ has heard or received any communication recently from neighboring communication stations $42_m$ in communication environment 40, communication station $42_3$ may preferably first estimate the direction of the node or communication station $42_m$ that transmitted the received packet and record both the direction of the transmission source and the NAV information in a Directional NAV (DNAV) table. For example, a DNAV table maintained by a communication station $42_m$ may include a list of (direction, NAV) entries. If the NAV of an entry expires, the entry (direction, NAV) may be either deleted from the DNAV table or may be marked as stale information. By way of example and not by way of limitation, if communication stations $42_3$, $42_4$ hear signals such as an RTS packet from communication station $42_1$. Communication stations $42_3$, $42_4$ may record the direction of the transmission (e.g., record Angle Of Arrival; AOA) and NAV information relating to the received signal so that communication stations $42_3$, $42_4$ may use the recorded or stored information for configuring to effect later directional communications. If a communication station $42_m$ overhears a differing transmission which uses different physical layer technology or MAC protocol, the communication station $42_m$ may mark this detection in a DNAV table so that the communication station $42_m$ does not use the direction associated with the detection for a predefined period of time. By way of example and not by way of limitation, such recording or storing of DNAV information relating to differing transmissions may mitigate interference caused by a heterogeneous wireless device in the same frequency band and in the same contention floor or communication environment.

If in communicating with communication station $42_3$ only the packet destined for communication station $42_4$ is received by communication station $42_4$, then the DNAV table for communication station $42_4$ may be empty. In such a circumstance, communication station $42_4$ may operate in an omni-directional mode. Upon receiving the RTS packet in the omni-directional mode, communication station $42_4$ may reply with a Clear-To-Send (CTS) packet in an omni-directional mode. However, if communication station $42_4$ has received (overheard) any unintended signal or packet from communication environment 40 not intended for communication station $42_4$ (including an interference signal) then communication station $42_4$ may employ a directional mode for both transmission and reception. The directional mode may be effected, by way of example and not by way of limitation, by forming a beam toward all the directions except the directions from which communication station $42_4$ received unintended signals. Another known approach for effecting beam forming is a null-steering technique.

If directions from which communication station $42_4$ received unintended signals do not overlap with the direction of communication station $42_3$, then communication station $42_4$ may reply with a CTS packet to communication station $42_3$ using a directional transmission mode to avoid interfering with the neighboring communications between various communication stations $42_m$. If directions from which communication station $42_4$ received unintended signals do overlap with the direction of communication station $42_3$, then communication station $42_4$ may preferably not respond to the RTS from communication station $42_3$ to avoid interfering with other communications in communication environment 40.

A communication control apparatus 100 may be employed with at least one of communication stations $42_m$ in carrying out communications according to the teachings of the present invention. It is preferred that a communication control apparatus 100 be employed with all communication stations $42_m$ carrying out communications in communication environment 40. Apparatus 100 may include a monitoring unit 102 for monitoring the communicating environment. Monitoring unit 102 may cooperate with communication station $42_3$ to ascertain whether communication station $42_3$ is receiving at least one unintended sensed signal not intended for communication station $42_3$ from at least one signal source.

Apparatus 100 may also include a communication mode unit 104 coupled with monitoring unit 102. Communication mode unit 104 may configure communication station $42_3$ for operation in an omni-directional mode if communication station $42_3$ has not received a predetermined number of at least one unintended sensed signal during a predetermined time interval. Communication mode unit 104 may configure communication station $42_3$ for operation in a directional mode if communication station $42_3$ has received a predetermined number of at least one unintended sensed signal during the predetermined time interval.

Apparatus 100 may also include a storing unit 106 coupled with monitoring unit 102 and coupled with communication mode unit 102. Storing unit 106 may save an indication of a respective reception direction from which arrived each received unintended sensed signal. Communication station $42_3$ may be configured in a directional mode to receive signals arriving from a sensing direction other than from each reception direction. Communication station $42_3$ may be configured in a directional mode to transmit signals toward the sensing direction.

In presenting an exemplary explanation of the operation of the invention it may be assumed that the DNAV table for communication station $42_4$ is empty and thus communication station $42_4$ may use an omni-directional mode for sending a CTS transmission to communication station $42_3$.

After successfully exchanging RTS and CTS control packets, communication station $42_3$ and communication station $42_4$ may operate in an omni-directional mode. By using the omni-directional mode, communication stations $42_3$, $42_4$ may utilize their respective multiple antennas for spatial multiplexing or STBC (or may use another technique) to increase the capacity or quality of a communication link between them. Upon successfully receiving the DATA packet from communication station $42_3$, communication station $42_4$ may reply with an Acknowledgement (ACK) packet in an omni-directional mode informing communication station $42_3$ that the data was successfully received.

During the omni-directional transmissions between communication stations $42_3$, $42_4$, neighboring nodes $42_m$ may initiate another communication simultaneously by employing directional communications. When a communication station or node $42_m$ desiring to transmit data in communication environment 40 substantially simultaneously receives an unintended signal (e.g., an RTS signal, a CTS signal, a data conveying signal not intended for communication station $42_m$, or a noise or interference signal), communication station $42_m$ may first transmit a RTS signal toward all the directions except the directions from which unintended signals have been received. The directions from which unintended signals have been received may be ascertained, by way of example and not by way of limitation, by referring to a DNAV table associated with communication station $42_m$. The desired directional communication may be carried out using a null-steering scheme by which nulls may be steered toward directions listed in the DNAV table. Such directional communication may prevent possible collision with the signal source that transmitted an unintended signal. When a communication station $42_m$ has no data to send, communication station $42_m$ may listen toward directions other than the directions from which unintended signals have been received.

When a communication station $42_m$ receives a RTS signal or packet intended for communication station $42_m$, communication station $42_m$ may reply with a CTS signal or packet using a directional communication mode toward all directions other than directions from which unintended signals have been received (e.g., listed in its DNAV table). By way of example and not by way of limitation, when communication station $42_3$ wishes to send data to communication station $42_4$ communication station $42_3$ may transmit a RTS signal or packet to area 60 using a directional communication mode. Upon receiving the RTS from communication station $42_3$, communication station $42_4$ may reply with a CTS packet to area 70 using a directional communication mode.

After successfully exchanging the RTS and CTS control packets between communication stations $42_3$, $42_4$, communication station $42_3$ may transmit a DATA packet to area 60 using a directional communication mode. After successfully receiving the data packet, communication station $42_4$ may reply with an ACK signal or packet to area 70 using a directional communication mode.

When directional transmission modes are employed in a wireless communication environment 40, some communication stations $42_m$ may not receive or hear transmissions from other transmitting communication stations $42_m$. This condition may be described as the non-hearing communication station $42_m$ being "deaf" to the other transmitting communication station $42_m$. This deafness problem degrades performance of a wireless network. One way this deafness problem has been addressed is to inform neighboring communication stations of a deafness situation by transmitting additional control packets. However, this approach increases complexity of the network or communication environment. In a preferred embodiment of the present invention, a restriction may be placed on the transmission time of a directional dialog between two communication stations $42_m$. That is, by way of example and not by way of limitation, directional communication between communication stations $42_3$, $42_4$ may end no later than the end of omni-directional communications between communication stations $42_1$, $42_2$. A time for termination of communications between communication stations $42_1$, $42_2$ may be indicated in the control packets overheard by communication stations $42_3$, $42_4$ and stored in DNAV tables accessible to communication stations $42_3$, $42_4$ (e.g., in respective storing units 106).

Figure 3:
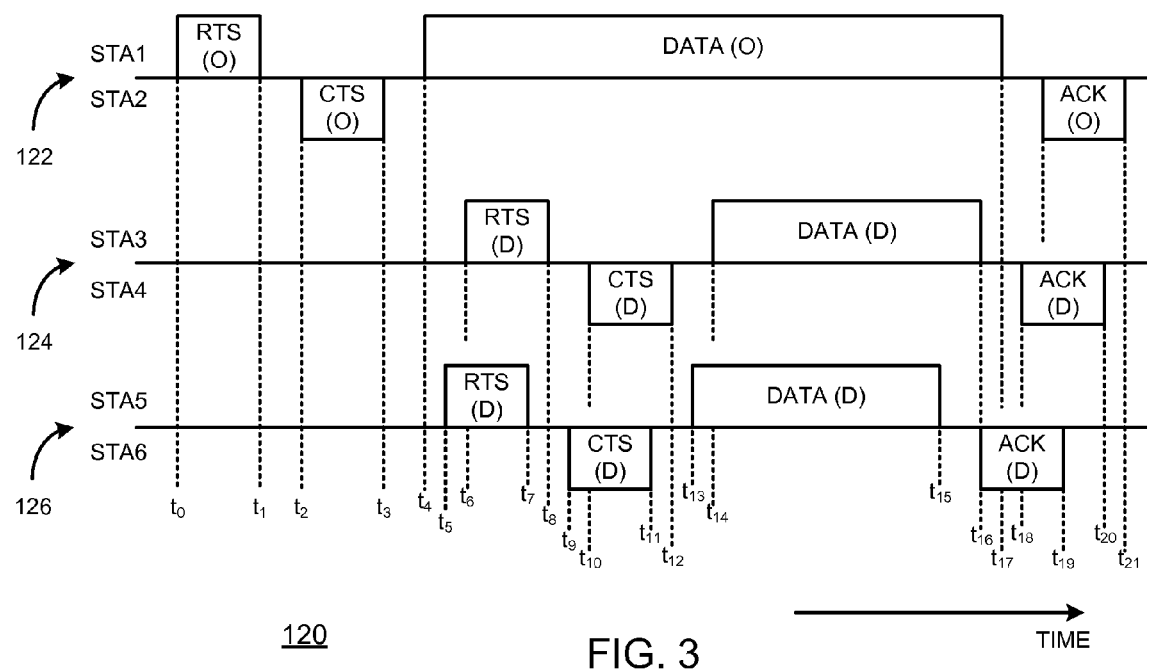
FIG. 3 is a graphic representation of particular aspects of operation of the system illustrated in FIG. 2.

FIG. 3 is a graphic representation of particular aspects of operation of the system illustrated in FIG. 2. In FIG. 3, a graphic presentation 120 may represent signal activities for stations in a communication environment with respect to time. A first dialog line 122 may represent omni-directional communications between communication stations STA1, STA2. A second dialog line 124 may represent directional communications between communication stations STA3, STA4. A third dialog line 126 may represent directional communications between communication stations STA5, STA5. Graphic presentation 120 may illustrate how communications between communication stations STA3, STA4 and between communication stations STA5, STA6 may be carried out without experiencing deafness with respect to communications from either of communication stations STA1, STA2.

Referring to dialog line 122, communication station STA1 may begin omni-directional communications by sending a RTS (Request To Send) signal or packet to communication station STA2 during a time interval $t_0$-$t_1$. Communication station STA2 may respond to the RTS signal sent by communication station STA1 with a CTS (Clear To Send) omni-directional signal or packet during a time interval $t_2$-$t_3$. After receiving the CTS signal from communication station STA2, communication station STA1 may send a data payload in a DATA signal using omni-directional communications during a time interval $t_4$-$t_{17}$. After receiving the DATA signal, communication station STA2 may send an ACK (Acknowledgement) signal or packet to communication station STA1 using omni-directional communications during a time interval $t_{19}$-$t_{21}$.

Referring to dialog line 124, communication station STA3 may begin directional communications by sending a RTS (Request To Send) signal or packet to communication station STA4 during a time interval $t_6$-$t_8$. Communication station STA4 may respond to the RTS signal sent by communication station STA3 with a CTS (Clear To Send) directional signal or packet during a time interval $t_{10}$-$t_{12}$. After receiving the CTS signal from communication station STA4, communication station STA3 may send a data payload in a DATA signal using directional communications during a time interval $t_{14}$-$t_{16}$. After receiving the DATA signal, communication station STA4 may send an ACK (Acknowledgement) signal or packet to communication station STA3 using directional communications during a time interval $t_{18}$-$t_{20}$.

Referring to dialog line $12_6$, communication station STA5 may begin directional communications by sending a RTS (Request To Send) signal or packet to communication station STA6 during a time interval $t_5$-$t_7$. Communication station STA6 may respond to the RTS signal sent by communication station STA5 with a CTS (Clear To Send) directional signal or packet during a time interval $t_9$-$t_{11}$. After receiving the CTS signal from communication station STA6, communication station STA5 may send a data payload in a DATA signal using directional communications during a time interval $t_{13}$-$t_{15}$. After receiving the DATA signal, communication station STA6 may send an ACK (Acknowledgement) signal or packet to communication station STA5 using directional communications during a time interval $t_{16}$-$t_{19}$.

To avoid "deafness" by communication stations STA3, STA4, STA5, STA6 with respect to communication stations STA1, STA2, a restriction may be placed on the transmission time of a directional dialog between any two of communication stations STA3, STA4, STA5, STA6. That is, by way of example and not by way of limitation as illustrated in FIG. 3, directional communication between communication stations STA3, STA4 may end no later than the end of omni-directional communications between communication stations STA1, STA2. As illustrated in FIG. 3, directional communications between communication stations STA3, STA4 may end at a time $t_{20}$ which is earlier than the time $t_{21}$ at which omni-directional communications between communication stations STA1, STA2 may terminate. By such an arrangement, communication stations STA3, STA4 may be assured of being aware of the presence of communication stations STA1, STA2. Further, communication stations STA3, STA4 may be alerted to listen for an indication that signals intended for communications station STA3 or communication station STA4 may be presented by one or more of communication stations STA1, STA2. A time for termination of communications between communication stations STA1, STA2 may be indicated in the control packets overheard by communication stations STA3, STA4 and stored in DNAV tables accessible to communication stations STA3, STA4 (e.g., in respective storing units 106; see FIG. 2).

Similarly, directional communication between communication stations STA5, STA6 may end no later than the end of omni-directional communications between communication stations STA1, STA2. As illustrated in FIG. 3, directional communications between communication stations STA5, STA6 may end at a time $t_{19}$ which is earlier than the time $t_{21}$ at which omni-directional communications between communication stations STA1, STA2 may terminate. By such an arrangement, communication stations STA5, STA6 may be assured of being aware of the presence of communication stations STA1, STA2. Further, communication stations STA5, STA6 may be alerted to listen for an indication that signals intended for communications station STA5 or communication station STA6 may be presented by one or more of communication stations STA1, STA2. A time for termination of communications between communication stations STA1, STA2 may be indicated in the control packets overheard by communication stations STA5, STA6 and stored in DNAV tables accessible to communication stations STA5, STA6 (e.g., in respective storing units 106; see FIG. 2).

Figure 4:
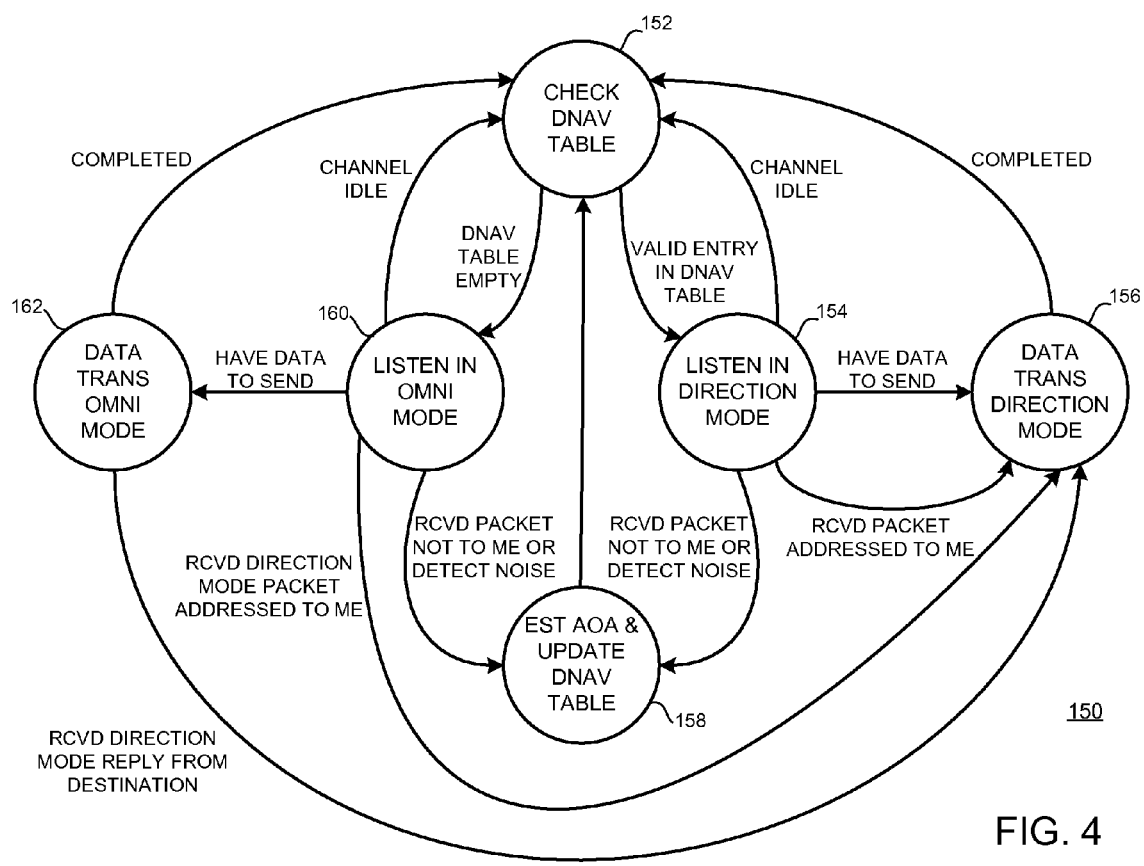
FIG. 4 is a state diagram illustrating operation of the preferred embodiment of the present invention.

FIG. 4 is a state diagram illustrating operation of the preferred embodiment of the present invention. In FIG. 4, a station operating according to a process 150 may be in an idle state indicated by a state 152. During idle state 152 the station may check its DNAV (Directional Network Allocation Vector) table. If there is a valid entry in the DNAV table, the station may listen in a directional communication mode (e.g., using a sweeping beam pattern), as indicated by a state 154. If the communication channel is idle, the process may return to idle state 152. If the station has data to send, the station may transmit the data in a directional mode, as indicated by a state 156. If the station receives a packet addressed to the station, the station may send an acknowledgement signal (e.g., ACK; FIG. 3) when in state 156. After transmission during state 156 is complete, the station may return to idle state 152.

If the station in idle state 152 receives a signal or packet not addressed to the station, the station may proceed to a state 158. In state 158 the station may estimate the Angle Of Arrival (AOA) of the received signal and may update its DNAV table to include the information relating to the latest received unintended signal (i.e., a signal not intended for or addressed to the receiving station). After updating the DNAV table the station may return to idle state 152.

If there is not a valid entry in the DNAV table when the station is in idle state 152, the station may listen in an omni-directional communication mode, as indicated by a state 160. If the communication channel is idle, the process may return to idle state 152. If the station has data to send, the station may transmit the data in an omni-directional mode, as indicated by a state 162. If the station receives a directional-mode reply to its omni-directional transmission, the station may send a directional response, as indicated by state 156, and thereafter may return to idle state 152. If the station receives no directional response to its omni-directional transmission (state 162) the station may return to idle state 152. If the station receives a directional-mode packet addressed to the station, the station may proceed from state 162 to state 156 and may send an Acknowledgement signal (e.g., ACK; FIG. 3). After transmission during state 156 is complete, the station may return to idle state 152.

If the station in state 160 receives a signal or packet not addressed to the station, the station may proceed to state 158. In state 158 the station may estimate the Angle Of Arrival (AOA) of the received signal and may update its DNAV table to include the information relating to the latest received unintended signal (i.e., a signal not intended for or addressed to the receiving station). After updating the DNAV table the station may return to idle state 152.

The invention may switch transmission or reception mode automatically between an omni-directional and a directional mode to increase the capacity of a network based on the neighboring nodes' communications. The present invention may operate to increase capacity of a communication network by switching its operation mode (i.e., its transmission mode or its reception mode) between an omni-directional and a directional mode depending upon on the network signal conditions. A network node or communication station may transmit or receive in an omni-directional mode to maximize communication link capacity or quality when no other neighboring nodes are actively transmitting packets. When there are pre-existing communications in the same contention floor or communication environment, a node may change its transmission mode or change its reception mode from an omni-directional mode to a directional mode and may carry out communications with certain other nodes or stations without interfering with the pre-existing communications. This capability for changing communication modes may increase the number of simultaneous transmissions in the same contention floor, which may increase network capacity.

The invention may automatically adjust transmission strategy to the density of the communication environment in which a network is situated. For a low density network, nodes may infrequently hear other nodes' communication and thus may use an omni-directional communication mode more frequently than a directional mode may be used for communications in order to maximize link performance and avoid increasing the number of simultaneous transmissions in the contention floor. For a high density network, nodes may hear other nodes' communication more frequently and may therefore use a directional communication mode to increase simultaneous transmission in the same contention floor so as to increase network capacity.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method operating a communication station in a communicating environment; the method comprising:
   monitoring, by said communication station, said communicating environment to ascertain whether said communication station is receiving at least one unintended sensed signal not intended for said communication station from at least one signal source;
   if said communication station has not received a predetermined number of said at least one unintended sensed signal during a predetermined time interval, operating said communication station in an omni-directional mode; and
   if said communication station has received said predetermined number of said at least one unintended sensed signal during said predetermined time interval, saving an indication of a respective reception direction from which arrived each said respective unintended sensed signal of said at least one unintended sensed signal, and
   operating said communication station in a directional mode; said communication station being sensitive to receiving signals arriving from a sensing direction other than from each said respective reception direction, and said communication station transmitting signals toward said sensing direction while in said directional mode.

2. The method of claim 1, wherein said monitoring is effected using a sweeping directional reception receiver apparatus.

3. The method of claim 1, wherein said at least one unintended sensed signal includes data conveying signals and interference signals.

4. The method of claim 1, wherein each said respective reception direction is recognized by said communication station as a sector having an angular dimension in at least one plane.

5. The method of claim 2, wherein said at least one unintended sensed signal includes data conveying signals and interference signals.

6. The method of claim 2, wherein each said respective reception direction is recognized by said communication station as a sector having an angular dimension in at least one plane.

7. The method of claim 5, wherein each said respective reception direction is recognized by said communication station as a sector having an angular dimension in at least one plane.

8. An apparatus operating a communication station in a communicating environment; the apparatus comprising:
   a monitoring unit to monitor said communicating environment; said monitoring unit to ascertain that said communication system receives less than a predetermined number of sensed signals not intended for said communication station during a first time period and receives at least the predetermined number of sensed signals not intended for said communication station during a second time period;
   a communication mode unit coupled with said monitoring unit; said communication mode unit to configure said communication station for operation in an omni-directional mode based on an ascertainment that said communication station received less than the predetermined number of sensed signals during the first time period; said communication mode unit to configure said communication station for operation in a directional mode based on an ascertainment that said communication station received at least the predetermined number of sensed signals during the second time period; and
   a storing unit coupled with said monitoring unit and with said communication mode unit; said storing unit to save an indication of a reception direction from which arrived at least one sensed signal not intended for said communication station; said communication station to be configured in said directional mode to receive signals arriving from a sensing direction other than from said reception direction; said communication station to be configured in said directional mode to transmit signals toward said sensing direction.

9. The apparatus of claim 8, wherein said monitoring is effected using a sweeping directional reception receiver apparatus.

10. The apparatus of claim 8, wherein a sensed signal not intended for the communication station and received by the communication station during the second time period includes an interference signal.

11. The apparatus of claim 10, wherein said reception direction is recognized by said communication station as a sector having an angular dimension in at least one plane.

12. The apparatus of claim 9, wherein a sensed signal not intended for the communication station and received by the communication station during the second time period includes an interference signal.

* * * * *